Oct. 29, 1929.  L. KIRSCHBRAUN  1,733,496
PRODUCTION OF AQUEOUS DISPERSIONS
Filed July 30, 1927
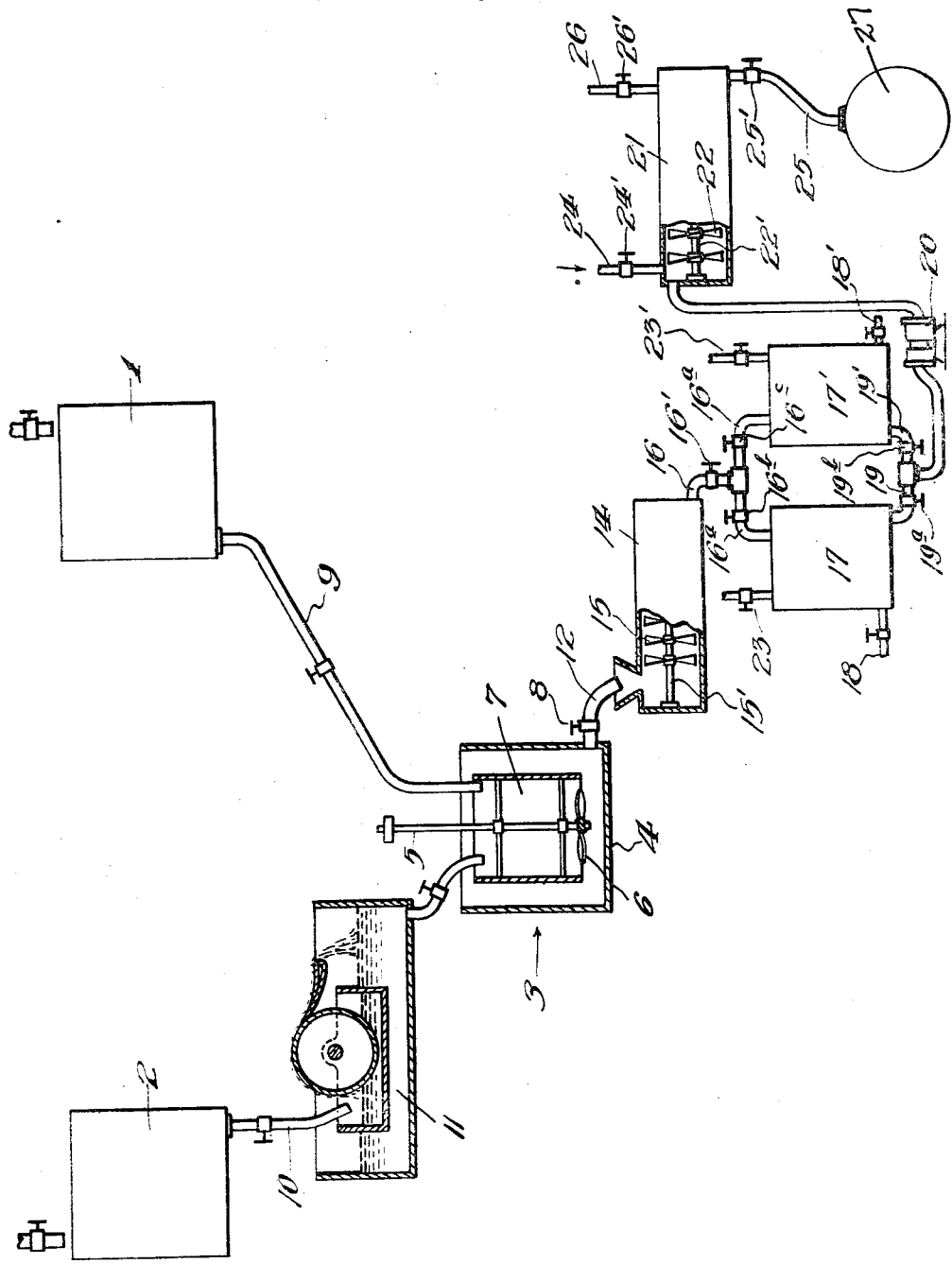
Witness:
Stephen F. Rebora
Inventor:
Lester Kirschbraun.
by Frank L. Belknap.
Atty'

Patented Oct. 29, 1929

1,733,496

UNITED STATES PATENT OFFICE

LESTER KIRSCHBRAUN, OF LEONIA, NEW JERSEY

PRODUCTION OF AQUEOUS DISPERSIONS

Application filed July 30, 1927. Serial No. 209,466.

This invention relates to improvements in the production of aqueous dispersions of the type disclosed in my prior Patent No. 1,615,303 dated January 25th, 1927.

Dispersions as heretofore produced in accordance with said patent generally contain about 50%–55% of the dispersed base, 3% more or less of the dispersing agent, the balance constituting the aqueous phase. For certain uses however, it is desirable that the ratio of the base dispersed be somewhat higher than the maximum above indicated. When attempt is made to increase the percentage of the base dispersed by merely incorporating relatively larger quantities of the base during the dispersing action, the mass undergoing dispersion soon becomes thickened to an undesirable consistency and the size of the particles increases to an extent where it becomes correspondingly more difficult to introduce further quantities of the base without producing inversion of the phases. Furthermore, in order to maintain proper working consistency, further quantities of water must be added with the result that the "body" of the product is impaired by the increased particle size and by the added amount of water. The "body" of the product in such case becomes much "shorter" and does not possess the desirable molasses-like consistency characteristic of a heavily or long bodied product of this nature having substantially the same viscosity but being composed of dispersed particles of a finer size. This consideration of the "body" of the product is important in the production of a product which may be readily spread or brushed out or subjected to similar treatment, inasmuch as it is a factor contributing to the ability of the product to remain indefinitely in suspension.

One of the objects of the present invention therefore, is to provide a process for producing dispersions having a maximum content of the dispersed base and a minimum content of the aqueous phase consistent with a suspendable body and viscosity in the finished product.

Another object of the invention is to provide a process in which a dispersion produced at one pH value may have its ratio of dispersed base increased while incorporating the added quantities of the base at a pH value either the same or materially different from the first named value.

In the drawings:

The figure illustrates diagrammatically an arrangement of apparatus which may be utilized in carrying out the process of the present invention.

Referring to the drawing, 1 represents conventionally an apparatus provided with suitable mixing or stirring mechanism for making an aqueous suspension of the material selected as the dispersive media. This media may be any one or a mixture of well known mineral powder paste-forming colloids, such as clay, bentonite, colloidal metallic oxides, silicates or the like. Where the dispersive media is composed of a mixture of clay and bentonite, the proportions of these constituents may vary from 50 parts clay and 50 parts bentonite, to 70 parts clay and 30 parts bentonite, more or less. The dispersive agent may be worked up in the blunger to a thin aqueous suspension containing say 7 to 10 parts by weight of water to one part by weight of the dispersing agent, more or less.

At 2 is indicated a supply of the base to be dispersed. This base may be any heat-liquefiable material normally immiscible with water, and may comprise for example, bituminous material either of a solid or semi-solid consistency such as asphalt, animal or vegetable pitches, resins, and the like. If desired, the selected base may be softened with a suitable fluxing.

By way of example, I may disperse steam refined asphalt having a melting point of say 100 to 200 degrees F., the asphalt being brough to a molten condition by heating at temperatures depending upon the melting point thereof.

The dispersing operation may be carried out in an apparatus such as illustrated at 3. This apparatus may comprise a container 4, within which is mounted a rapidly rotating shaft 5, having agitating propellers 6 fixed thereto. The container may be provided with a baffle 7 which may take the form of an open-ended conduit, arranged concentrically with, and spaced from the inner surface of the container. The propeller blades are preferably pitched in such fashion that the material undergoing agitation by the rapid rotation of the propellers is forced downwardly internally of the conduit and then around and upwardly through the annular space between the conduit and the wall of the container. To regulate the temperature conditions within the container, the walls thereof may be jacketed in an obvious manner, or they may be lined with coils for conveying therethrough suitable temperature regulating media. If desired, the conduit 7 may also be jacketed for the reception of temperature regulating means.

A bulk supply of the end product may be constantly maintained within the container 4, a valve being provided at 8 for the withdrawal of finished material.

In carrying out the dispersion with the aforenamed combination of ball clay and bentonite, the hydrogen ion concentration of the aqueous suspension may be preferably adjusted to a predetermined pH value so as to enable the dispersion to be effected under controlled conditions of hydrogen ion concentration. This adjustment may be made with any reagents desired, such as sulphuric, chromic, oxalic acids, aluminum sulphate or potassium dichromate, sodium acid phosphate or the like, or basic reagents if increased basicity is required. The pH value at which the dispersion may best be carried on, will obviously depend upon the character of the materials treated. With steam-refined Mexican asphalt, and using a dispersive media as above indicated, an adjustment of the pH value of the dispersive media to about 6.2 more or less is desirable. Effective dispersion has also been attained with the above asphalt at a pH value of about 3.0 to 3.5 although the amount of acidic material necessary to bring the hydrogen ion concentration to this value is usually sufficient to induce an objectionable degree of thickening in the mass undergoing dispersion, so that the rate of dispersion may be slower than at pH 6.2 although large amounts of asphalt relative to dispersing agent can be introduced; or, in order to overcome the thickening, water must be added in such quantities as to impair the suspendabality of the product. By dispersing the particular asphalt described at a pH value of around 6.2, the foregoing objectionable thickening and the resultant slower operation, may be avoided.

The aqueous suspension adjusted to the desired pH value and the molten asphalt or other base may be conducted in separate streams through the feed pipes 9 and 10, respectively, to the dispersing apparatus 3.

It is further essential for successful dispersion, especially where low melting point asphalt is used, to operate under temperature conditions controlled so as to avoid partial or complete coalescence or the formation of particles of an undesirably large size.

Thus, if the temperature of the fluid asphalt entering the dispersing apparatus, or if the mass undergoing dispersion is permitted to rise too high, particles of large size may be formed and the material in the dispersing apparatus must be cooled or additional water must be added to avoid partial or complete coalescence of dispersed particles, so that the body and viscosity of the product are impaired by virtue of the increased particle size as well as by the added amount of aqueous phase.

To regulate the temperature of the incoming asphalt, a cooling device 11 may be interposed, a shown, in the feed line 10. Where the material being dispersed is an asphalt having a melting point of say 110 degrees, the temperature of the stream entering the dispersing apparatus should be substantially 160 degrees F. Likewise, the temperature within the dispersing apparatus should be controlled and maintained within reasonably narrow limits.

The dispersed material may be withdrawn continuously from the dispersing apparatus through the valved discharge pipe 12, located adjacent the lower end of the container 4.

In accordance with the present invention, I have found that the asphalt content of the product may be considerably enhanced so that the proportion of asphalt to dispersing agent is correspondingly increased. It is desirable in certain instances, for example, that the asphaltic content in the water-free film of the dispersion should be as high as practicable so that the remaining solids, comprising the dispersing agent, in the dried film are kept at a minimum quantity to thereby provide a water-free film of maximum impermeability.

In order to disperse such additional quantities of the base, I preferably first direct the thick pasty product withdrawn from the dispersing apparatus 3, to the beating unit 14, which may be provided with revolving impact blades 15 mounted on shaft 15', or to an equivalent apparatus where it may be subjected to a rapid agitating or beating treatment as described in my issued Patent No. 1,616,904 dated February 8th, 1927, to thereby reduce the viscosity of the mass to a more fluid consistency and to impart to it a molasses-like consistency and a "long" body. The material beaten and thinned out by the action in the unit 14, may be continuously withdrawn and conveyed through pipe 16 controlled by a valve 16' to a header 16ª in which may be interposed valve 16ᵇ and 16ᶜ, which header may communicate with storage tank or reservoirs 17 and 17'.

A batch of the thinned material may then be withdrawn from one of these reservoirs through the pipes 19 and 19' controlled by valves 19ª and 19ᵇ respectively, and delivered to a second beating apparatus 21, suitable pumping devices being shown at 20 for this purpose. The beating apparatus 21 may be a double pug mill mixer or it may be substantially identical with the apparatus shown at 14, provided with revolving impacting blades 22 mounted on shaft 22' for rapidly agitating and beating the material within the tank. As the material is being further beaten in this apparatus, further quantities of asphalt may be introduced through the pipe 24 controlled by valve 24', and the addition of asphalt is continued until the mass begins to thicken appreciably. If the batch be so thick that additional quantities of water are necessary before more asphalt can be dispersed, this second dispersing action may, if desired, be followed by another beating stage, and this alternate beating and introduction of base, water and/or both repeated as long as the system can be restored to a usable consistency.

If desired, the asphalt ratio may be increased by the alternate addition to the initial dispersion of asphalt and water in quantities approximating the relative proportions of these constituents to be present in the final desired composition. Thus, starting with an initial dispersion containing say 60% of asphalt, 4% dispersing agent, and 36% water, as produced in instrumentality 3, and beating out such dispersion in 14 to thin the same and then carrying out the procedure as above described, with the addition to the thinned dispersion of asphalt and water in quantities of say 66% of the former and 34% of the latter, the final dispersion will contain about 63% of asphalt, 2% of emulsifying agent and 35% of water. In other words, by this type of operation, I am enabled to finally double the quantity of asphalt dispersed relative to dispersing agent as compared with the quantity initially dispersed. In the before-mentioned example, the ratio of asphalt to dispersing agent is increased from about 15:1 to about 30:1.

If desired, the base introduced at 24 may be of a character different from that of the material intially dispersed at 3. Thus, for example, the initial dispersion may be made of a relatively low melting point asphalt and the material added at 24 may be a relatively high melting-point asphalt, or vice versa.

The final product may be withdrawn from the apparatus 21 through the pipe 25 controlled by valve 25' and led to suitable storage tank 27.

In some cases it may be desirable to produce a final product having the high ratio of asphalt or other base, as above specified, and having a pH value as low as 3 to 3.5. Dispersions having approximately this pH value when freed from water, result in a highly impervious film. I have above pointed out, however, certain objections to carrying on the initial dispersing action at a pH value approximating 3 to 3.5. The present process, on the other hand, lends itself very admirably to the production of dispersions having relatively low pH values as indicated, and yet containing relatively high quantities of asphalt as compared to the other constituents of the system. Thus, having produced an initial dispersion at a pH value of say, 6.2 or thereabouts, this initial material may be thinned out by the beating action in 14, and then any suitable pH adjusting means may be added through pipe 26 controlled by valve 26', to a batch of the material in 21 in quantities sufficient to bring the hydrogen ion concentration thereof to a pH value ranging from say 3.0 to 3.5 as desired. Here, likewise, and before any further quantities of asphalt are added, the agitating action is continued for a sufficient length of time to relieve the thickening caused by the addition of the adjusting electrolyte, the introduction of asphalt being preferably delayed until the mass has been reduced to the desired viscosity by the beating action.

It is to be noted that while the foregoing operation involves the treatment of a batch supply in the apparatus 21, the dispersing operation carried on in the apparatus shown at 3 is nevertheless continuous and is not interrupted by the batch operation carried on at 21. This is readily apparent, since as above described, the asphalt and the aqueous suspension of dispersive media are supplied to the dispersing apparatus 3 in continuous streams, the initial dispersion being continuously withdrawn at 12, thinned out by the beating action in 14, and stored as a bulk supply in either one of the reservoirs 17, 17', from which it may be fed in batches to the tank 21 for the treatment effected therein.

I have stated above that the dispersing action in 3 is preferably carried out with an aqueous suspension of dispersive media whose hydrogen ion concentration has been adjusted to a predetermined pH value, the example given for a particular asphalt being 6.2 more or less, and it will be apparent to one skilled in the art that the dispersion of the selected base may result in varying slightly the hydrogen ion concentration of the system. Thus, when dispersing steam refined Mexican asphalt of the character indicated with a suspension of dispersive media adjusted to a pH value of 6.2, the dispersed mass as withdrawn from the container 4 may have a pH value of 6.7 more or less, such increase in the pH value being obviously occasioned by the relatively basic character of the asphalt as compared to the dispersing media adjusted to the pH value of 6.2. Where it is desired therefore, that the final product have a pH value in the region of 6.2 instead of about 3.5, obviously only minor adjustment with electrolyte will be necessary, the quantity of adjusting electrolyte required to restore the system from pH of 6.7 to pH 6.2 being generally insufficient to cause any noticeable degree of thickening of the initial dispersion whose viscosity has been reduced by the beating treatment in 14. In such case, therefore, the operation of enhancing the asphalt content of the initial dispersion may be carried on in a wholly continuous manner, instead of in a batch procedure as is necessary where sufficiently large quantities of electrolyte are added to bring the system to a pH of 3.5. This continuous operation may be carried on by adjusting the pH value of the thinned dispersion in either of the tanks 17, 17', one of these tanks being connected to the outlet of the beater 14 and being supplied with the thinned initial dispersion, while a previously accumulated supply in the other tank is adjusted as to pH value by introducing an adjusting electrolyte through the pipe 23 or 23' as the case may be. When the pH of the material in the last named tank has been restored to the proper point, the material is continuously supplied therefrom to the second beating apparatus 21 and the additional quantities of asphalt are incorporated therein in the manner already described. By suitable valve connections in the pipes 16ª and 19, the tanks 17 and 17' may be operated alternately so that as one is being filled the material in the other is being supplied, after proper pH adjustment to the beater 21, thus providing a wholly continuous type of operation.

Where it is desired to utilize some of the initial product whose viscosity has been reduced at 14, without the incorporation of further quantities of asphalt therein, the same may be withdrawn from the tanks 17 and 17' through the discharge outlets 18 and 18'.

I claim as my invention:

1. In the process of producing an aqueous dispersion of a bitumen-pitch type base, the steps which comprise producing an initial dispersion of the base at a predetermined hydrogen ion concentration, reducing the viscosity of said dispersion, and thereafter dispersing further quantities of the base in the mass of reduced viscosity while maintaining said mass at a predetermined hydrogen ion concentration different from the first named hydrogen ion concentration.

2. The process which comprises forming an aqueous dispersion of a bitumen pitch-type base containing substantially the maximum amount of base which can be efficiently dispersed with a given amount of dispersive media, said dispersion being of paste-like consistency, subjecting the dispersion to a further beating action to reduce its viscosity and thereafter adding further quantities of the base to the beaten mass and dispersing the same without incorporation of the same relative quantity of dispersive media so that the ratio of base to dispersive media is increased relative to the initial dispersion.

3. The process which comprises forming an aqueous dispersion of a bitumen pitch-type base, said dispersion being of a paste-like consistency, in subjecting the dispersion to a further beating action to reduce its viscosity whereby to condition said dispersion for the reception of further quantities of bitumen pitch-type material, and in thereafter adding further quantities of the bitumen pitch-type base to the beaten mass whereby to reduce the water content of the finished product relative to the initial dispersion.

4. The process which comprises forming an aqueous dispersion of a bitumen pitch-type base, said dispersion being of a paste-like consistency, in removing the thus formed dispersion to a separate zone and subjecting it to a beating or whipping action to reduce its viscosity without substantially increasing the water content thereof and in thereafter dispersing further quantities of the bitumen pitch-type base in said beaten mass.

5. The process which comprises forming an aqueous dispersion of a bitumen pitch-type base, said dispersion being of a paste-like consistency, and in alternately beating the dispersion to reduce its viscosity and adding further quantities of bitumen to the beaten mass to be dispersed therein whereby to produce maximum bitumen content and minimum content of aqueous phase.

6. The process which comprises forming an aqueous dispersion of a bitumen-pitch-type base, said dispersion being of a paste-like consistency, subjecting the dispersion to a further beating action to reduce its viscosity, adjusting the hydrogen ion concentration of the beaten mass to a predetermined pH value whereby to condition said dispersion for the reception of further quantities of bitumen-pitch-type material, and thereafter adding further quantities of the bitumen-pitch-type base to the beaten mass whereby to reduce the water content of the finished product relative to the initial dispersion.

7. The process which comprises forming an aqueous dispersion of a bitumen-pitch-type base, said dispersion being of a paste-like consistency, in subjecting the dispersion to a further beating action to reduce its viscosity, and adding an electrolyte to the beaten mass, whereby to condition said dispersion for the reception of further quantities of bitumen-pitch-type material and in thereafter adding further quantities of the base to the beaten mass whereby to reduce the water content of the finished product relative to the initial dispersion.

In testimony whereof I affix my signature.

LESTER KIRSCHBRAUN.